(12) United States Patent
Syed et al.

(10) Patent No.: US 11,967,337 B2
(45) Date of Patent: Apr. 23, 2024

(54) DETERMINATION OF NOISE PRESENCE IN RECORDED SOUNDS

(71) Applicant: HEWLETT-PACKARD DEVELOPMENT COMPANY, L.P., Spring, TX (US)

(72) Inventors: Hassan A. Syed, Spring, TX (US); Hoang Van Ngo, Spring, TX (US); Steve Mark Brauns, Fort Collins, CO (US); Kwok Chi Kwong, Spring, TX (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 142 days.

(21) Appl. No.: 17/794,416

(22) PCT Filed: Jan. 23, 2020

(86) PCT No.: PCT/US2020/014704
§ 371 (c)(1),
(2) Date: Jul. 21, 2022

(87) PCT Pub. No.: WO2021/150222
PCT Pub. Date: Jul. 29, 2021

(65) Prior Publication Data
US 2023/0066470 A1   Mar. 2, 2023

(51) Int. Cl.
*G10L 25/51* (2013.01)
(52) U.S. Cl.
CPC .................................. *G10L 25/51* (2013.01)

(58) Field of Classification Search
CPC ......... G10L 25/51; G10L 25/78; G10L 25/87; G10L 21/0264; G10L 21/0272; H04R 29/00; H04R 2400/01
USPC ..................................... 381/56, 58, 123, 124
See application file for complete search history.

(56) References Cited

U.S. PATENT DOCUMENTS

| | | | |
|---|---|---|---|
| 4,346,268 A | 8/1982 | Geerling | |
| 8,509,451 B2 | 8/2013 | Hayakawa | |
| 8,879,744 B2 | 11/2014 | Yang et al. | |
| 8,965,766 B1 | 2/2015 | Weinstein et al. | |
| 8,994,381 B2 | 3/2015 | Quan | |
| 2012/0155661 A1* | 6/2012 | Ma | H04L 67/125 381/58 |
| 2014/0307880 A1* | 10/2014 | Forman | G10L 21/0208 381/58 |

(Continued)

FOREIGN PATENT DOCUMENTS

| | | |
|---|---|---|
| CN | 103747408 A | 4/2014 |
| CN | 103167391 B | 4/2016 |

*Primary Examiner* — William A Jerez Lora
(74) *Attorney, Agent, or Firm* — Knobbe, Martens, Olson & Bear, LLP (57) ABSTRACT

In some examples, a non-transitory computer-readable medium stores machine-readable instructions which, when executed by a processor, cause the processor to cause a playback device to produce a sound using an audio file; cause a recording device to record the sound; compare the audio file to the recorded sound; determine, based on the comparison, whether the recorded sound comprises a noise not present in the audio file; and cause, based on the determination, a second recording device to be selected, a multiplexer to select a second playback device, or a combination thereof.

15 Claims, 4 Drawing Sheets

(56) References Cited

U.S. PATENT DOCUMENTS

2016/0011846 A1* 1/2016 Sheen .................... H04R 27/00
　　　　　　　　　　　　　　　　　　　　　　700/94
2019/0045298 A1* 2/2019 Klemme ................. A61F 11/04
2019/0385634 A1* 12/2019 Traynor ................. G10L 25/18

* cited by examiner

DETERMINATION OF NOISE PRESENCE IN RECORDED SOUNDS

BACKGROUND

Acoustic noise is a noise detectable by a human ear. Acoustic noise is often unintended and undesirable. Electronic devices are equipped with numerous components that may create acoustic noise. Additionally, the electronic devices may be located in environments that produce acoustic noise. A user of an electronic device may detect the acoustic noise when utilizing the electronic device.

BRIEF DESCRIPTION OF THE DRAWINGS

Various examples will be described below referring to the following figures.

DETAILED DESCRIPTION

As discussed above, a user of an electronic device (e.g., desktop, laptop, notebook, tablet, smartphone, mobile device) may detect an acoustic noise (herein referred to as "noise") when utilizing the electronic device. As an illustrative case, the user may power up the electronic device and detect a high-pitched whining sound. As another illustrative case, the user may plug in earbuds to listen to music and detect noise that is not part of the music. A source of the noise, or noise source, may be either internal to the electronic device or external to the electronic device. Components of the electronic device may be a noise source. Components are hardware devices coupled to the electronic device. Components may include a central processing unit (CPU), a graphics processing unit (GPU), a fan, a power supply, a memory device, a display, a sound card, a recording device, or a playback device, for instance. Other sources of noise may be items located in the environment, such as other electronic devices.

This disclosure describes various examples of a system configured to determine noise sources. A noise source is an internal component of the system, an external component coupled to the system, or something in the environment that introduces an undesirable sound detectable by a user. Using a playback device (e.g., a speaker) of the system, the system produces a sound utilizing an audio file having a frequency within a range of frequencies detectable by humans (e.g., 0-20 kilohertz (kHz)). Using a recording device (e.g., a microphone) of the system, the system records the sound. The system compares the recorded sound to the audio file to determine if the recorded sound comprises a noise not present in the audio file. The system may repeat the process for multiple audio files, multiple playback devices, multiple recording devices, or a combination thereof. The system may compare the subsequent recorded sounds to previous recorded sounds to determine a noise source utilizing a process of elimination.

In an example in accordance with the present disclosure, a system is provided. The system comprises a non-transitory computer-readable medium storing machine-readable instructions which, when executed by a processor, cause the processor to cause a playback device to produce a sound using an audio file; cause a recording device to record the sound; compare the audio file to the recorded sound; determine, based on the comparison, whether the recorded sound comprises a noise not present in the audio file; and cause, based on the determination, a second recording device to be selected, a multiplexer to select a second playback device, or a combination thereof.

In another example in accordance with the present disclosure, an electronic device is provided. The electronic device comprises a first recording device; a connector to couple to a second recording device; a multiplexer coupled to a playback device; a storage device comprising machine-readable instructions; and a processor coupled to the first recording device, the connector, the multiplexer, and the storage device. Execution of the machine-readable instructions causes the processor to select the first recording device; cause the multiplexer to select the playback device; cause the playback device to produce a first sound using a first audio file; cause the first recording device to record the first sound; detect, in the first sound, a noise not present in the first audio file; select the second recording device; cause the playback device to produce a second sound using a second audio file; cause the second recording device to record the second sound; compare the recorded first sound to the recorded second sound; and determine, based on the comparison, a source of the noise.

In yet another example in accordance with the present disclosure, a method is provided. The method comprises producing, by a first playback device, a first sound using a first audio file; recording, by a recording device, the first sound; detecting, in the recorded first sound, a noise not present in the first audio file; producing, by a second playback device, a second sound using a second audio file; recording, by the recording device, the second sound; comparing the recorded first sound to the recorded second sound; and determining, based on the comparison, a source of the noise.

Figure 1:
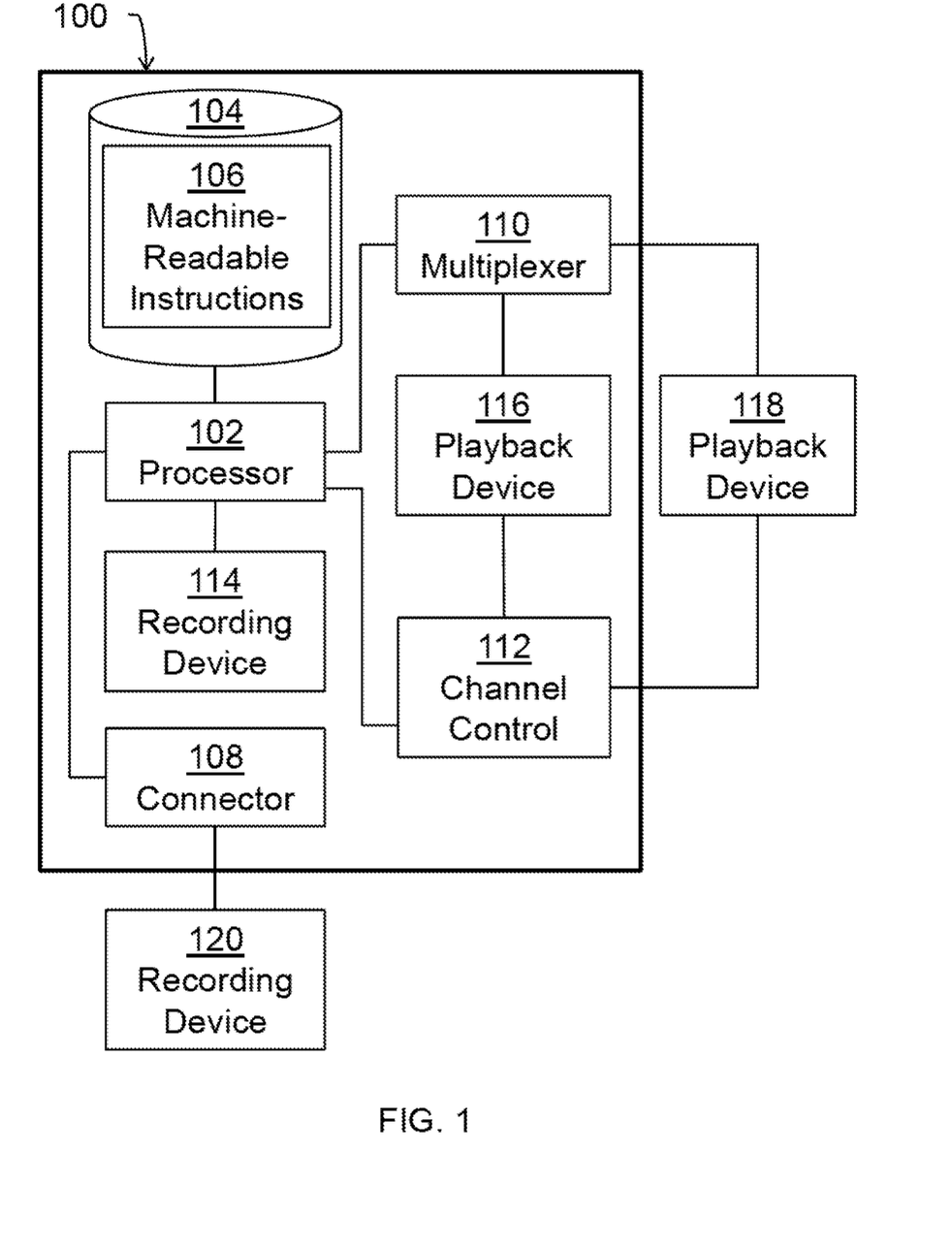
FIG. 1 is a schematic diagram of an electronic device for determining noise sources, in accordance with various examples.

FIG. 1 is a schematic diagram of an electronic device 100 for determining noise sources, in accordance with various examples. The electronic device 100 comprises a processor 102, a storage device 104, a connector 108, a multiplexer 110, a channel control 112, a recording device 114 and a playback device 116. The electronic device 100 may be a desktop computer, a laptop computer, a notebook computer, a tablet, a smartphone, a mobile device, or any other device with an ability to play a sound and to record the sound, for example. The processor 102 may comprise a microprocessor, a microcomputer, a microcontroller, or another suitable controller, for example. The storage device 104 may include a hard drive, a solid state drive (SSD), flash memory, random access memory (RAM), or other suitable memory, for example. The connector 108 may allow for a wired coupling (e.g., audio jack, USB plug, XLR connector) or a wireless coupling (e.g., Wi-Fi, Bluetooth), for example. The multiplexer 110 may be a switch, digital logic gates, or some other electronic component or circuitry that allows the processor 102 to select between components of the electronic device 100, for example. The channel control 112 may be a switch, digital logic gates, or some other electronic component or circuitry that allows the processor 102 to select between multiple channels of the playback device 116, for example.

The electronic device 100 includes multiple couplings. The connector 108 is coupled to a recording device 120. The multiplexer 110 is coupled to the playback device 116 and a playback device 118. The channel control 112 is coupled to the playback devices 116, 118. The recording devices 114, 120 may be microphones, mixers, or digital voice recorders, for example. The playback devices 116, 118 may be headsets, earbuds, or speakers, for example. The processor 102 is coupled to the storage device 104, the connector 108, the multiplexer 110, the channel control 112, and the recording device 114. The storage device 104 may comprise machine-readable instructions 106, which, when executed, may cause the processor 102 to perform some or all of the actions attributed herein to the processor 102.

In various examples, a first recording device may be referred to as an internal recording device while a second recording device may be referred to as an external recording device. For example, the recording device 114 may be referred to as an internal recording device and the recording device 120 may be referred to as an external recording device. In other examples, a first playback device may be referred to as an internal playback device while a second playback device may be referred to as an external playback device. For example, the playback device 116 may be referred to as an internal playback device and the playback device 118 may be referred to as an external playback device. When a device is referred to as "internal," the device is located within a chassis of the electronic device 100. When a device is referred to as "external," the device is located outside the chassis of the electronic device 100 and able to couple to the electronic device 100 via a connector. The connector may be internal or external to the electronic device 100. The connector may be connector 108, for example. In another example, the connector may be a docking station. In various examples, the connector may allow for coupling to multiple devices. For example, the connector may be a USB hub, an external sound card, or an audio splitter. The multiple devices may be recording devices, playback devices, or some combination thereof.

In some examples, the processor 102 may cause a playback device to produce a sound and a recording device to record the sound. As discussed below with respect to FIG. 2, the sound may be produced utilizing an audio file. In various examples, the recorded sound may be stored to the storage device 104 as an audio file. The processor 102 may cause any number of playback devices to produce the sound and any number of recording devices to record the sound. A playback device of the number of playback devices may be internal or external. A recording device of the number of recording devices may be internal or external. For example, the processor 102 may cause the internal playback device 116 to produce the sound and the internal recording device 114 to record the sound. In another example, the processor 102 may cause the external playback device 118 to produce the sound and the internal recording device 114 to record the sound.

In other examples, the playback devices 116, 118 may comprise multiple channels. For example, the playback devices 116, 118 may have a left channel and a right channel. The left channel may control a left speaker and the right channel may control a right speaker, for example. The channel control 112 may allow the processor 102 to select the left channel, the right channel, or both channels, for example. In various examples, the processor 102 may cause a playback device to produce a first sound utilizing a first channel of the playback device and to produce a second sound utilizing a second channel of the playback device. For example, the processor 102 may cause the playback device 118 to produce the first sound utilizing a right channel and to produce a second sound utilizing a left channel. In other examples, the processor 102 may cause a playback device to produce the first sound utilizing a first channel and a second channel of the playback device and to produce a second sound utilizing a second channel of the playback device. For example, the processor 102 may cause the playback device 116 to produce the first sound utilizing the left channel and the right channel and to produce the second sound utilizing the right channel. In yet other examples, the processor 102 may cause a playback device to produce the first sound and the second sound utilizing the same channel or channels. For example, the processor 102 may cause the playback device 116 to produce the first sound utilizing the left channel and to produce the second sound utilizing the left channel.

In various examples, the processor 102 may utilize a process of elimination to determine a noise source. The processor 102 may determine a noise source is not a playback device. The processor 102 may determine a noise source is not a recording device. The processor 102 may repeat the determination for each playback device of the electronic device 100 and for each recording device of the electronic device 100. For an example, see discussion below with respect to FIG. 2. The processor 102 may determine a noise source is not a component other than a playback device or a recording device by causing an external recording device positioned in close proximity to a suspected noise source to record a sound produced by a playback device. For an example, see discussion below with respect to FIG. 3. By eliminating components of the electronic device 100 as possible noise sources, the processor 102 may determine the noise source is external to the electronic device 102.

Figure 2:
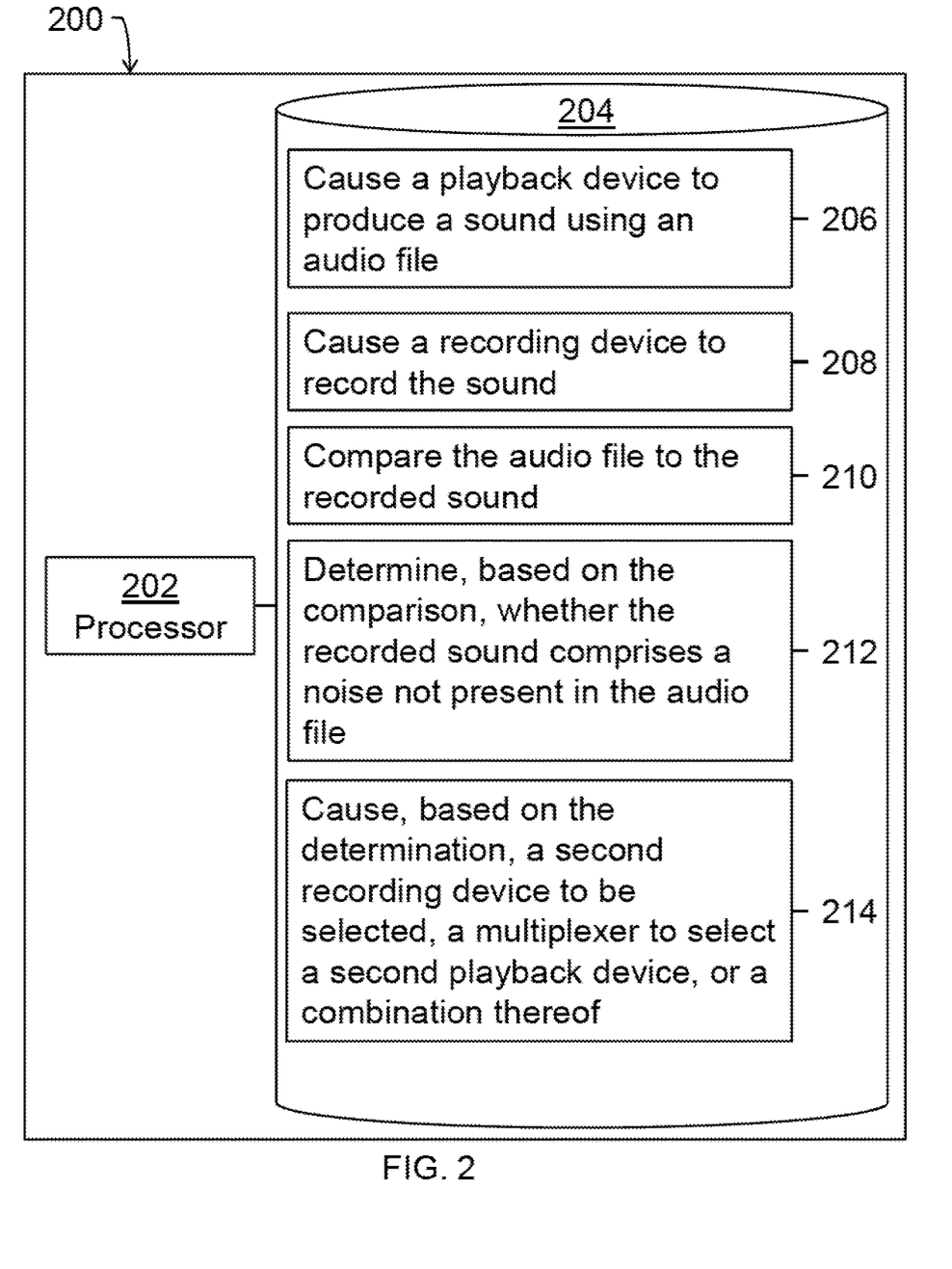
FIG. 2 is a schematic diagram of a system for determining noise presence in recorded sounds, in accordance with various examples.

FIG. 2 is a schematic diagram of a system 200 for determining noise presence in recorded sounds, in accordance with various examples. The system 200 comprises a computer-readable medium 204 and a processor 202 coupled to the computer-readable medium 204. The system 200 may be the electronic device 100, for example. The computer-readable medium is a non-transitory medium. The non-transitory medium includes all electronic mediums of storage, except signals. The computer-readable medium 204 may be a storage device such as a hard drive, solid state drive (SSD), flash memory, random access memory (RAM), or other suitable memory, for example. The computer-readable medium 204 may be the storage device 104, for example. The processor 202 may be a microprocessor, a microcomputer, a microcontroller, or another suitable controller, for example. The processor 202 may be the processor 102, for example. The computer-readable medium 204 may store machine-readable instructions, which, when executed, cause the processor 202 to perform some or all of the actions attributed herein to the processor 202.

The computer-readable medium 204 comprises machine-readable instructions 206, 208, 210, 212, and 214. The machine-readable instructions 206, 208, 210, 212, 214 may be machine-readable instructions 106, for example. The machine-readable instructions 206, 208, 210, 212, 214 may be machine-readable instructions for execution by the processor 202. Execution of the machine-readable instructions 206, 208, 210, 212, 214 may cause the processor 202 to cause a playback device to produce a sound, cause a recording device to record the sound, and determine whether the recorded sound comprises a noise. Execution of machine-readable instruction 206 may cause the processor 202 to cause a playback device to produce a sound using an audio file. Execution of machine-readable instruction 208 may cause the processor 202 to cause a recording device to record the sound. Execution of machine-readable instruction 210 may cause the processor 202 to compare the audio file to the recorded sound. Execution of machine-readable instruction 212 may cause the processor 202 to determine, based on the comparison, whether the recorded sound comprises a noise not present in the audio file. Execution of machine-readable instruction 214 may cause the processor 202 to cause, based on the determination, a second recording device to be selected, a multiplexer to select a second playback device, or a combination thereof.

In various examples, the processor 202 may cause a display to prompt a user to select a playback device from a list of playback devices coupled to the system 200. For example, the user may be prompted to select the playback device from a list comprising a speaker coupled to the system 200 internally (e.g., system speaker), headphones coupled to the system 200 utilizing an audio jack (e.g., headphones, earbuds), speakers coupled to the system 200 utilizing a USB connector (e.g., USB speaker), or speakers coupled to the system 200 utilizing a docking station (e.g., docking station speaker). In some examples, the processor 202 may cause a display to prompt the user to select a recording device from a list of recording devices coupled to the system 200. For example, the user may be prompted to select the recording device from a list comprising a microphone coupled to the system 200 internally (e.g., system microphone), a microphone coupled to the system 200 utilizing a USB connector (e.g., USB microphone), a microphone coupled to the system 200 via an audio mixer (e.g., audio mixer microphone), or a microphone coupled to the system 200 utilizing a docking station (e.g., docking station microphone). In other examples, the processor 202 may cause a display to prompt the user to select an audio file from a list of audio files. The audio file is a file storing digital audio data. The audio file may be an uncompressed audio format. For example, the audio file may be a waveform audio file format (WAV). The digital audio data may comprise data having frequencies within a range of 0 to 20 kilohertz (kHz). In various examples, the audio files the user may select comprise data in uniform ranges. For example, the user may be presented with audio files having a 1 kHz range.

In some examples, the processor 202 may cause the playback device 116 to produce a sound using an audio file. For example, the audio file may be user selected as discussed above. In another example, the processor 202 may automatically select the audio file. In various examples, the processor 202 may cause the recording device 114 to record the sound. The processor 202 may compare the audio file to the recorded sound. The processor 202 may determine, based on the comparison, whether the recorded sound comprises a noise not present in the audio file.

In various examples, the processor 202 may determine whether a noise is present by utilizing a Fast Fourier Transform (FFT) engine to generate an FFT waveform of the data in the audio file and to generate an FFT waveform of the recorded sound. The processor 202 may compare the FFT waveform of the data in the audio file to the FFT waveform of the recorded sound to determine whether a noise is present in the recorded sound. In some examples, the processor 202 may cause a display of the system 200 to show the FFT waveform of the data in the audio file and the FFT waveform of the recorded sound. For example, the FFT waveforms may be displayed on a graph. In various examples, if a noise is present in the recorded sound, the FFT waveform of the recorded sound deviates from the FFT waveform of the data in the audio file by more than a threshold. For example, the FFT waveform of the recorded sound may approximate the FFT waveform of the data in the audio file for a first time period; spike to a frequency above a frequency of the data in the audio file by more than the threshold for a second time period; and return to approximate the FFT waveform of the data in the audio file for a third time period. In some examples, the threshold may be set by the user. For example, the processor 202 may cause a display to prompt the user to select the threshold. In other examples, the processor 202 may determine the threshold based on a specification of the playback device, the recording device, or a component that is a suspected noise source. In various examples, the processor 202 may determine the noise is outside a specified tolerance of the threshold. The specified tolerance may account for sound dampening due to an enclosure of the electronic device 100, for example. In other examples, if the FFT waveform of the recorded sound closely approximates the FFT waveform of the data in the audio file for a duration of the audio file, then the processor 202 may determine a noise is not present in the recorded sound. For example, when displayed on the graph, the FFT waveform of the recorded sound may overlap the FFT waveform of the data in the audio file for the duration of the audio file.

In various examples, the processor 202 may cause, based on the determination, the second recording device 120 to be selected, the multiplexer 110 to select the second playback device 118, or a combination thereof. Utilizing the previous example in which the processor 202 selected the recording device 114 to record the sound generated by the playback device 116, the processor 202 may select the second recording device 120, for example. The processor 202 may cause the playback device 116 to produce a second sound using a second audio file. In some examples, the second audio file may be the first audio file. For example, both the first audio file and the second audio file may be a WAV file having digital audio data within a 10-11 kHz range. The processor 202 may cause the second recording device 120 to record the second sound. In some examples, such as when the second audio file is the first audio file, the processor 202 may compare the first audio file to the recorded second sound to determine if the recorded second sound comprises a noise not present in the first audio file. Based on the comparison, the processor 202 may determine a noise source of the recorded second sound. For example, based on a comparison of an FFT waveform of the recorded first sound to an FFT waveform of the data of the first audio file, the processor 202 may determine the recorded first sound does not comprise a noise. The processor 202 may utilize the FFT engine to generate an FFT waveform of the recorded second sound. The processor 202 may compare the FFT waveform of the recorded second sound to the FFT waveform of the data of the recorded first sound to determine the recorded second sound comprises a noise not present in the recorded first sound. Utilizing a process of elimination, the processor 202 may determine a noise source in the recorded second sound. For example, the processor 202 may determine the noise source is not the playback device 116 because the playback device 116 is utilized to produce the first sound and the second sound, but the second sound alone comprises noise. The processor 202 may determine the noise source is not the first recording device 114 because the first recording device 114 is utilized to capture the recorded first sound which does not comprise noise. By eliminating the playback device 116 and the first recording device 114 as possible noise sources, the processor 202 may determine the noise source in the recorded second sound is the second recording device 120.

In other examples, the processor 202 may cause both the second recording device 120 and the first recording device 114 to record the second sound. The recorded second sound may be recorded into a single digital audio file. In some examples, such as when the second audio file is the first audio file, the processor 202 may compare the recorded first sound to the recorded second sound to determine if the recorded second sound comprises a noise not present in the recorded first sound. Based on the comparison, the processor 202 may determine a noise source of the recorded second sound. For example, based on a comparison of an FFT waveform of the recorded first sound to an FFT waveform of the data of the first audio file, the processor 202 may determine the recorded first sound does not comprise a noise. The processor 202 may utilize the FFT engine to generate an FFT waveform of the recorded second sound. The processor 202 may compare the FFT waveform of the recorded second sound to the FFT waveform of the recorded first sound to determine the recorded second sound comprises a noise not present in the recorded first sound. Utilizing a process of elimination, the processor 202 may determine a noise source in the recorded second sound. For example, the processor 202 may determine the noise source is not the playback device 116 because the playback device 116 is utilized to produce the first sound and the second sound, but the second sound alone comprises noise. The processor 202 may determine the noise source is not the first recording device 114 because the first recording device 114 is utilized to capture the recorded first sound and the recorded second sound, but the second sound alone comprises noise. By eliminating the playback device 116 and the first recording device 114 as possible noise sources, the processor 202 may determine the noise source in the recorded second sound is the second recording device 120.

Figure 3:
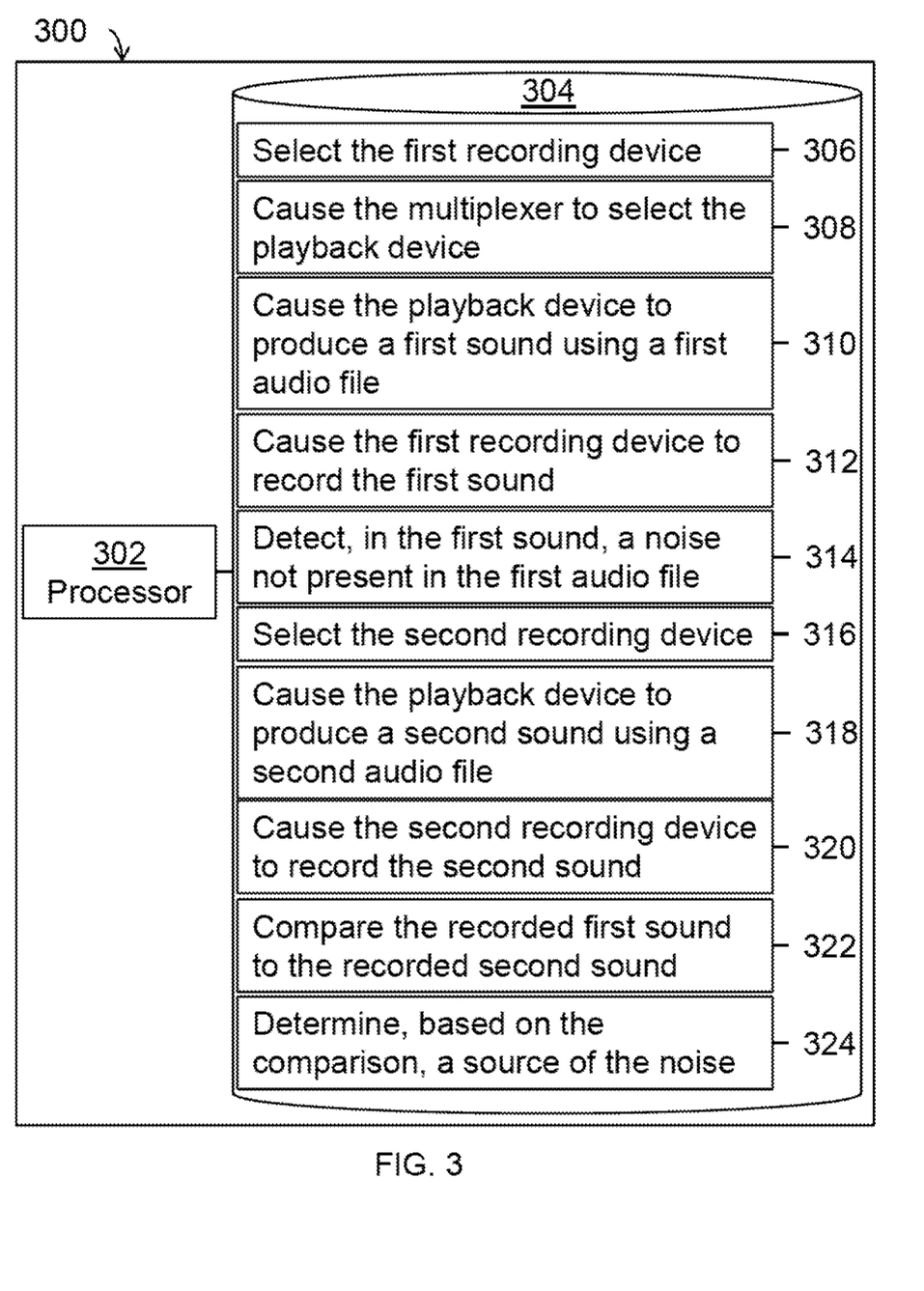
FIG. 3 is a schematic diagram of a system for determining noise sources, in accordance with various examples.

FIG. 3 is a schematic diagram of a system 300 for determining noise sources, in accordance with various examples. The system 300 comprises a computer-readable medium 304 and a processor 302 coupled to the computer-readable medium 304. The system 300 may be the electronic device 100 or the system 200, for example. The computer-readable medium 304 may be a storage device such as a hard drive, solid state drive (SSD), flash memory, random access memory (RAM), or other suitable memory, for example. The computer-readable medium 304 may be the storage device 104 or the computer-readable medium 204, for example. The processor 302 may be a microprocessor, a microcomputer, a microcontroller, or another suitable controller, for example. The processor 302 may be the processor 102, 202, for example. The computer-readable medium 304 may store machine-readable instructions, which, when executed, cause the processor 302 to perform some or all of the actions attributed herein to the processor 302.

The computer-readable medium 304 comprises machine-readable instructions 306, 308, 310, 312, 314, 316, 318, 320, 322, and 324. The machine-readable instructions 306, 308, 310, 312, 314, 316, 318, 320, 322, 324 may be machine-readable instructions 106, for example. The machine-readable instructions 306, 308, 310, 312, 314, 316, 318, 320, 322, 324 may be machine-readable instructions for execution by the processor 302. Execution of the machine-readable instructions 306, 308, 310, 312, 314, 316, 318, 320, 322, 324 may cause the processor 302 to cause a playback device to produce a sound, a first recording device to record the sound, detect a noise in the recorded sound, cause a playback device to produce a second sound, cause a second recording device to record the second sound, and determine a source of the noise.

Execution of machine-readable instruction 306 may cause the processor 302 to select the first recording device. Execution of machine-readable instruction 308 may cause the processor 302 to cause a multiplexer to select the playback device. Execution of machine-readable instruction 310 may cause the processor 302 to cause the playback device to produce a first sound using a first audio file. Execution of machine-readable instruction 312 may cause the processor 302 to cause the first recording device to record the first sound. Execution of machine-readable instruction 314 may cause the processor 302 to detect, in the first sound, a noise not present in the first audio file. Execution of machine-readable instruction 316 may cause the processor 302 to select the second recording device. Execution of machine-readable instruction 318 may cause the processor 302 to cause the playback device to produce a second sound using a second audio file. Execution of machine-readable instruction 320 may cause the processor 302 to cause the second recording device to record the second sound. Execution of machine-readable instruction 322 may cause the processor 302 to compare the recorded first sound to the recorded second sound. Execution of machine-readable instruction 324 may cause the processor 302 to determine, based on the comparison, a source of the noise.

In various examples, the processor 302 may select an external recording device (e.g., 120) as the first recording device. The external recording device may be positioned adjacent to a suspected noise source. For example, the user may suspect a fan of the system 300 is the suspected noise source and place the external recording device near the fan. The processor 302 may cause a multiplexer to select an internal playback device (e.g., 116). The processor 302 may cause the internal playback device to produce the first sound utilizing a first audio file. The processor 302 may cause the external recording device to record the first sound. The processor 302 may detect, in the first sound, a noise not present in the first audio file. For example, the processor 302 may utilize the FFT engine discussed above with respect to FIG. 2 to detect the noise. The processor 302 may select a second external recording device. The processor 302 may cause the internal playback device to produce a second sound utilizing a second audio file. The processor 302 may cause the second external recording device to record the second sound. The processor 302 may compare the recorded first sound to the recorded second sound. The processor 302 may determine, based on the comparison, a source of the noise. For example, such as when the second audio file is an audio file of the recorded first sound, utilizing a process of elimination, the processor 302 may determine the fan is the source of the noise when both the recorded first sound and the recorded second sound are substantially equivalent. In another example, such as when the second audio file is the first audio file, utilizing a process of elimination, the processor 302 may determine the first external recording device is the source of the noise if the recorded second sound does not contain the noise of the recorded first sound. In yet other examples, the processor 302 may repeat the testing. For example, the processor 302 may repeat the testing utilizing the same first audio file. In another example, the processor 302 may repeat the testing utilizing a third audio file having a different frequency than a frequency of the first audio file.

In some examples, the processor 302 may cause a channel control (e.g., 112) to select both a first channel and a second channel of the playback device before causing the playback device to produce the first sound utilizing the first channel and the second channel. In other examples, the processor 302 may cause the channel control to select a first channel of the playback device before causing the playback device to produce the second sound utilizing the first channel. The processor 302 may utilize a process of elimination to determine a channel of the playback device is the noise source. For example, if the processor 302 does not detect the noise of the recorded first sound in the recorded second sound, the processor 302 may determine that the second channel of the playback device is the noise source.

Figure 4:
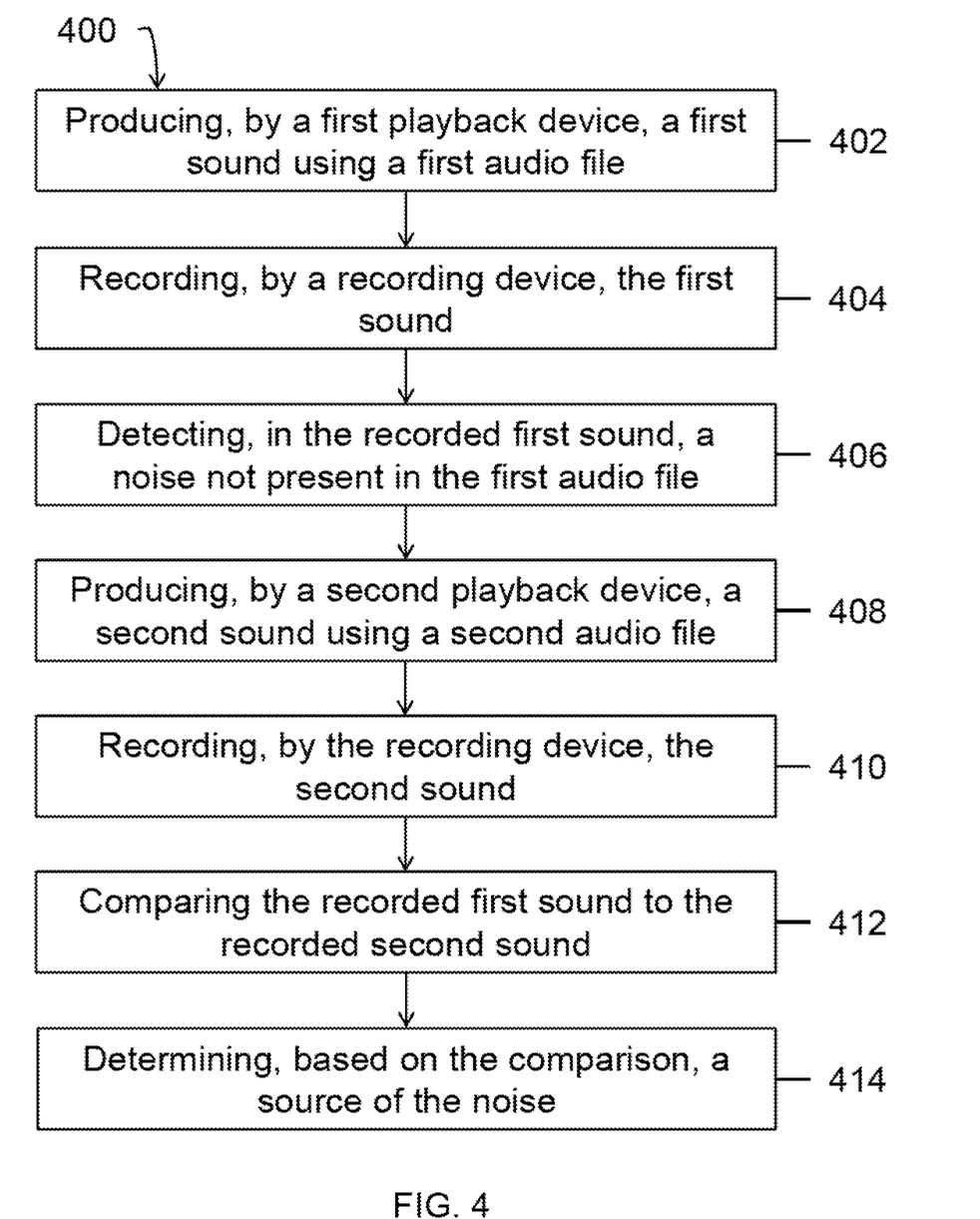
FIG. 4 is a flow diagram of a method for determining a noise source of an electronic device, in accordance with various examples.

FIG. 4 is a flow diagram of a method 400 for determining a noise source of an electronic device, in accordance with various examples. The method 400 may be performed, for example, by the processor 102, 202, 302. The electronic device may be the electronic device 100, for example. The method 400 includes producing, by a first playback device, a first sound using a first audio file (402). The method 400 also includes recording, by a recording device, the first sound (404). In addition, the method 400 includes detecting, in the recorded first sound, a noise not present in the first audio file (406). Additionally, the method 400 includes producing, by a second playback device, a second sound using a second audio file (408). The method 400 also includes recording, by the recording device, the second sound (410). In addition, the method 400 includes comparing the recorded first sound to the recorded second sound (412). Additionally, the method 400 includes determining, based on the comparison, a source of the noise (414).

In various examples, the method 400 includes utilizing a multiplexer (e.g., 110) to select the playback device from an internal playback device (e.g., 116), an external playback device (e.g., 118), or a combination thereof. For example, the processor 102 may utilize the method 400 to cause the multiplexer 110 to select an internal playback device 116. In some examples, the method 400 includes utilizing a channel control (e.g., 112) to select a first channel, a second channel, or both channels of the playback device. Continuing the previous example in which the processor 102 causes the multiplexer 110 to select the internal playback device 116, the processor 102 may utilize the method 400 to cause the channel control 112 to select a first channel and a second channel of the internal playback device 116, for example. The processor 102 may cause the internal playback device 116 to produce a first sound using the first channel and the second channel of the internal playback device 116, for example.

In other examples, the method 400 includes selecting a playback device by sending a signal to enable the selected playback device. In yet other examples, the method 400 includes sending a signal to disable any playback devices not selected. For example, a processor may utilize the method 400 to send a signal to select a first playback device, to send a signal to disable a second playback device, and to send a signal to disable a third playback device. In some examples, the method 400 includes selecting a channel of a selected playback device by sending a signal to enable the channel or to enable multiple channels of the playback device. For example, a processor may utilize the method 400 to send a signal to select a left channel of a first playback device. In another example, the processor may utilize the method 400 to send a signal to select a left channel and a right channel of a second playback device.

In some examples, the method 400 includes selecting a recording device from an internal recording device (e.g., 114), and external recording device (e.g., 120), or a combination thereof. For example, the processor 102 may utilize the method 400 to select the recording device 114 and the recording device 120. In various examples, the method 400 includes selecting the recording device by sending a signal to enable the selected recording device or to enable the selected recording devices. For example, a processor may utilize the method 400 to send a signal to select a first recording device and to send a signal to select a second recording device. In other examples, the method 400 includes sending a signal to disable any recording devices not selected. Continuing the previous example in which the processor selected the first recording device and the second recording device, the processor may utilize the method 400 to send a signal to disable a third recording device, for example.

The above discussion is meant to be illustrative of the principles and various examples of the present disclosure. Numerous variations and modifications will become apparent to those skilled in the art once the above disclosure is fully appreciated. It is intended that the following claims be interpreted to embrace all such variations and modifications.

In the figures, certain features and components disclosed herein may be shown exaggerated in scale or in somewhat schematic form, and some details of certain elements may not be shown in the interest of clarity and conciseness. In some of the figures, in order to improve clarity and conciseness, a component or an aspect of a component may be omitted.

In the above discussion and in the claims, the terms "including" and "comprising" are used in an open-ended fashion, and thus should be interpreted to mean "including, but not limited to . . . ." Also, the term "couple" or "couples" is intended to be broad enough to encompass both indirect and direct connections. Thus, if a first device couples to a second device, that connection may be through a direct connection or through an indirect connection via other devices, components, and connections. As used herein, including in the claims, the word "or" is used in an inclusive manner. For example, "A or B" means any of the following: "A" alone, "B" alone, or both "A" and "B."

What is claimed is:

1. A non-transitory computer-readable medium storing machine-readable instructions which, when executed by a processor, cause the processor to:
   cause a playback device to produce a sound using an audio file;
   cause a recording device to record the sound;
   compare the audio file to the recorded sound;
   determine, based on the comparison, whether the recorded sound comprises a noise not present in the audio file; and
   cause, based on the determination, a second recording device to be selected, a multiplexer to select a second playback device, or a combination thereof.

2. The non-transitory computer-readable medium of claim 1, wherein a frequency of the audio file is between 0 and 20 kilohertz (kHz).

3. The non-transitory computer-readable medium of claim 1, wherein execution of the machine-readable instructions causes the processor to:
   select the second recording device;
   cause the playback device to produce a second sound using a second audio file;
   cause both the second recording device and the first recording device to record the second sound;
   compare the recorded sound to the recorded second sound;

determine, based on the comparison, a source of the noise of the recorded second sound.

4. The non-transitory computer-readable medium of claim 3, wherein the second audio file is the first audio file.

5. The non-transitory computer-readable medium of claim 3, wherein the second recording device is external to an electronic device.

6. The non-transitory computer-readable medium of claim 3, wherein the first recording device is internal to an electronic device and the second recording device is external to the electronic device.

7. An electronic device, comprising:
a first recording device;
a connector to couple to a second recording device;
a multiplexer coupled to a playback device;
a processor coupled to the first recording device, the connector, and the multiplexer; and
a storage device coupled to the processor, the storage device comprising machine-readable instructions which, when executed, cause the processor to:
select the first recording device;
cause the multiplexer to select the playback device;
cause the playback device to produce a first sound using a first audio file;
cause the first recording device to record the first sound;
detect, in the first sound, a noise not present in the first audio file;
select the second recording device;
cause the playback device to produce a second sound using a second audio file;
cause the second recording device to record the second sound;
compare the recorded first sound to the recorded second sound; and
determine, based on the comparison, a source of the noise.

8. The electronic device of claim 7, wherein the second audio file is an audio file of the recorded first sound.

9. The electronic device of claim 7, wherein execution of the machine-readable instructions causes the processor to cause the playback device to produce the first sound utilizing a first channel and a second channel of the playback device and to produce the second sound utilizing a second channel of the playback device.

10. The electronic device of claim 7, wherein the recorded second sound is recorded by the first recording device and the second recording device.

11. A method, comprising:
producing, by a first playback device, a first sound using a first audio file;
recording, by a recording device, the first sound;
detecting, in the recorded first sound, a noise not present in the first audio file;
producing, by a second playback device, a second sound using a second audio file;
recording, by the recording device, the second sound;
comparing the recorded first sound to the recorded second sound; and
determining, based on the comparison, a source of the noise.

12. The method of claim 11, wherein a multiplexer selects the playback device from a playback device internal to an electronic device, a playback device external to the electronic device, or a combination thereof.

13. The method of claim 11, wherein the first playback device is internal to an electronic device and the second playback device is external to the electronic device.

14. The method of claim 11, comprising producing the first sound and the second sound utilizing a first channel and a second channel of the first playback device and a second channel of the second playback device, respectively.

15. The method of claim 11, comprising producing the first sound and the second sound utilizing a first channel of the first playback device and a second channel of the second playback device, respectively.

* * * * *